United States Patent
Chang et al.

(12) 
(10) Patent No.: US 6,187,862 B1
(45) Date of Patent: Feb. 13, 2001

(54) WEATHERABLE RESINOUS COMPOSITION HAVING IMPROVED OPACITY AND IMPACT STRENGTH

(75) Inventors: Moh Ching Oliver Chang, Leverkusen (DE); Richard M. Auclair, Westfield; Robert A. Sanocki, Monson, both of MA (US)

(73) Assignee: Bayer Corporation, Pittsburgh, PA (US)

( * ) Notice: Under 35 U.S.C. 154(b), the term of this patent shall be extended for 0 days.

(21) Appl. No.: 09/071,089

(22) Filed: May 1, 1998

(51) Int. Cl.$^7$ ........................................... C08L 47/00
(52) U.S. Cl. ........................ 525/84; 525/85; 525/87; 525/302; 525/309; 525/310; 525/315; 525/316
(58) Field of Search ................................ 525/84, 85, 87, 525/302, 309, 310, 315, 316

(56) References Cited

U.S. PATENT DOCUMENTS

| | | |
|---|---|---|
| 3,055,859 | 9/1962 | Vollmert . |
| 3,691,260 | 9/1972 | Mittnacht et al. . |
| 4,668,737 | 5/1987 | Eichenauer et al. ................. 525/73 |
| 5,229,209 * | 7/1993 | Gharapetian et al. ............. 428/403 |
| 5,382,625 | 1/1995 | Lindner et al. ....................... 525/81 |
| 5,708,082 | 1/1998 | Huang ................................... 525/87 |

FOREIGN PATENT DOCUMENTS

| | | |
|---|---|---|
| 19503545 * | 8/1996 | (DE) . |
| 0 104 899 | 4/1984 | (EP) . |
| 0 258 741 | 3/1988 | (EP) . |
| 534212 | 3/1993 | (EP) . |
| 1124911 | 1/1966 | (GB) . |
| 96/23839 | 8/1996 | (WO) . |

* cited by examiner

*Primary Examiner*—Jeffrey Mullis
(74) *Attorney, Agent, or Firm*—Joseph C. Gil; Aron Preis

(57) ABSTRACT

A thermoplastic molding composition comprising a grafted rubber and a copolymeric matrix is disclosed. The composition is characterized in that its grafted rubber includes a substrate, a first grafted phase and a subsequent grafted phase which are sequentially grafted to said substrate. The substrate which contains a crosslinked elastomer is grafted with a first grafted phase and with a subsequent grafted phase, both phases containing copolymers of at least one vinylaromatic monomer and at least one member selected from the group consisting of (meth)acrylonitrile and alkyl (meth)acrylate. The relative ratios of the monomers making up the copolymerized phases differ one from the other. The grafted rubber is present in particulate form having a weight average particle size of about 0.1 to 1.0 microns. The composition features improved impact strength and reduced opacity.

12 Claims, No Drawings

WEATHERABLE RESINOUS COMPOSITION HAVING IMPROVED OPACITY AND IMPACT STRENGTH

The invention concerns a thermoplastic molding composition which contains a grafted rubber, and more particularly a composition where the grafted phase entails grafting, in sequence, a first and subsequent phase.

SUMMARY OF THE INVENTION

A thermoplastic molding composition comprising a grafted rubber and a copolymeric matrix is disclosed. The composition is characterized in that its grafted rubber includes an elastomeric, crosslinked substrate, a first grafted phase and a subsequent grafted phase which are sequentially grafted to said substrate. Preferably, the substrate contains preferably crosslinked, core containing the polymerization product of at least one vinylaromatic monomer, and a shell containing a crosslinked rubber. The first grafted phase and the subsequent grafted phase, both contain copolymers of at least one vinylaromatic monomer and at least one member selected from the group consisting of (meth)acrylonitrile and alkyl (meth)acrylate, yet the relative ratios of the monomers making up the copolymerized phases differ one from the other. The grafted rubber is present in particulate form having a weight average particle size of about 0.1 to 1.0 microns. The composition features improved impact strength and reduced opacity.

BACKGROUND OF THE INVENTION

It has long been known that thermoplastically processable styrene/acrylonitrile copolymers (SAN) may be imparted improved impact properties by the incorporation of rubbers. In ABS polymers, diene polymers are used as the rubbers for toughening, most notably at low temperatures; however, the relatively poor weathering and aging resistance make these materials less favored in more demanding applications. In some such applications, use has successfully been made of crosslinked acrylic acid ester polymers; these are the well known ASA copolymers. Such have been described in U.S. Pat. No. 3,055,859 and in German 1,260,135 and 1,911,882. Accordingly, the preferably cross-linked, rubbery acrylic acid ester polymer which serves as the grafting base (substrate) is first prepared by emulsion polymerization and the latex thus prepared is then grafted, preferably by emulsion, with a mixture of styrene and acrylonitrile. The art thus has long recognized that improved impact strength, notched Izod, greater hardness and reduced shrinkage are associated with such ASA products which have as a grafting base a coarse polyacrylate latex having a mean particle diameter of about 150 to 800 nm and a narrow particle size distribution. Also, noted in the present context is the disclosure in U.S. Pat. No. 4,224,419 which disclosed an ASA based composition which contains two different graft copolymers of SAN onto crosslinked acrylates, and a hard copolymeric SAN component.

The art refers to "hard" and "soft" segments in terms of the relative position of their glass transition temperature, vis a vis, room temperature. "Hard" means $T_g$ above room temperature and "soft" means below room temperature, as well as to core/shell structures including structures which contain a multiplicity of shells. Multi-phase structured emulsion copolymers, including hard-soft and hard morphologies, have been disclosed in EP 534,212 and in the documents referenced therein. Accordingly, graft copolymers with a hard core of polystyrene, a first butyl acrylate shell and an outer SAN shell have been disclosed in the art. Significantly, the '212 document disclosed a monomodal system wherein particles measure less than 0.2 microns and have a styrene core. In an example, the '212 document disclosed the preparation of a four stage graft copolymerized with a styrene core as a graft base, a first shell of butyl acrylate, a second shell of styrene and a third shell of styrene/acrylonitrile.

Also presently relevant are copending patent applications U.S. Ser. No. 08/974,541 filed Nov. 19, 1997 and Ser. No. 08/955,857 filed Oct. 21, 1997, both assigned to Bayer Corporation and both concern weatherable composition containing grafted rubber components.

DETAILED DESCRIPTION OF THE INVENTION

The invention is directed to a thermoplastic molding composition comprising a grafted rubber and a copolymeric matrix wherein grafted rubber includes a crosslinked elastomeric substrate, a first grafted phase and a subsequent grafted phase which are sequentially grafted to said substrate. The first grafted phase and the subsequent grafted phase are chemically different one from the other. Preferably, the substrate contains an advantageously crosslinked core which contains the polymerization product of at least one vinylaromatic monomer, and a shell containing a crosslinked rubber selected from the group consisting of polyalkyl acrylate, hydrogenated polydiene polydiene, and wherein said first grafted phase contains a copolymer of at least one vinylaromatic monomer and at least one member selected from the group consisting of (meth)acrylonitrile and alkyl (meth)acrylate, where the polymerized product of said monomer is present in an amount of at least 75 percent and the polymerized product of said member is present in an amount of at most 25% relative to the weight of said first grafted phase, and where said subsequent grafted phase contains a copolymer of at least one vinyl-aromatic monomer, and at least one member selected from a group consisting of (meth)acrylonitrile and alkyl(meth)acrylate, where said polymerized product of said vinylaromatic monomer is present in an amount of about 60 to 75 percent and the polymerized product of said member of said group is present in an amount of about 25 to 40 percent relative to the weight of said subsequent grafted phase, and wherein weight ratio of said first grafted phase to said subsequent grafted phase is 1/4 to 4/1, said grafted rubber is present in particulate form having a weight average particle size of about 0.1 to 1.0 microns, and wherein matrix contains the polymerized product of at least one vinylaromatic monomer and at least one monomer selected from the group consisting of (meth)acrylonitrile and alkyl(meth)acrylate.

In a more preferred embodiment, the invention is directed to the above described thermoplastic molding composition comprising (i) 15 to 50 percent by weight (pbw) of the above described grafted rubber and (ii) 85 to 50 pbw of a the above described matrix, the percent being relative to the total of (i) and (ii).

(i) The Grafted Rubber and Its Preparation

The grafted rubber component includes a substrate (S) onto which are grafted: a first grafted phase (P1) and a subsequent grafted phase (P2). The grafted phases are sequentially grafted to the substrate by conventional processes. Essentially, the first grafted phase is polymerized in the presence of the substrate to produce a precursor and the subsequent phase is polymerized and grafted on to the precursor in a subsequent step. The processes for the preparation of the substrate and the grafting processes are conventional and are well known in the art. Relevant information may be found in ABS Resins, Stanford Research Institute, Report No. 20, December 1966, Muller, R. G., Takaoka, S., and in Encyclopedia of Polymer Science and Engineering, 2nd Ed., Vol. 1, pp 400–405, (1985).

The weight ratio of the substrate to the total weight of the grafted phases, the ratio (S)/(P1+P2) is advantageously in the range of 60/40 to 90/10, most preferably the ratio is about 70/80 to 30/20. The first and subsequent phases relate by weight one to the other (P1/P2) in the range of 20/80 to 80/20, preferably 33/67 to 67/33.

The substrate (S) is characterized in that it contains an elastomeric crosslinked rubber. In a more preferred embodiment, the substrate contains a core (C) and a shell (SH). In this more preferred embodiment, the core and shell relate one to the other by weight, that is (C)/(SH), in the range of 1/99 to 25/75.

The substrate is essentially a crosslinked elastomer which contains at least one member selected from the group consisting of polyalkyl acrylate, hydrogenated polydiene and polydiene.

In the preferred embodiment where the substrate contains a core and a shell, the core (C) is polymerized in any of the known methods, from at least one member selected from the group consisting of styrene, $\alpha$-methyl styrene, ring-halogenated styrene and ring-alkylated styrene. The core is preferably crosslinked; crosslinking is attained by means which are well known in the art.

The shell (SH) is essentially a crosslinked rubber which envelopes the core; the rubber is a member selected from the group consisting of polyalkyl acrylate, hydrogenated polydiene and polydiene.

The preparation of the core-shell structure is well known in the art. Relevant information may be found in U.S. Pat. Nos. 3,793,402 and 5,384,361 as well as in Polymer Mater. Sci. Eng. 63, 583 (1990) all incorporated herein by reference and in UK Patent Specification 1,340,025.

The first grafted phase (P1) contains a copolymer of at least one monomer selected from a third group (3GP) consisting of styrene, $\alpha$-methyl styrene, ring-halogenated styrene and ring-alkylated styrene, and at least one monomer selected from a fourth group (4GP) consisting of (meth) acrylonitrile and methylmethacrylate. The amount of copolymerized monomer of said third group (3GP) is at least 75 percent relative to the weight of said first grafted phase (P1) and the amount of copolymerized monomer of said fourth group (4GP) is at most 25 percent relative to the weight of said first grafted phase (P1).

The subsequent grafted phase (P2) contains a copolymer of at least one monomer selected from a fifth group (5GP) consisting of styrene, $\alpha$-methyl styrene, ring-halogenated styrene and ring-alkylated styrene, and at least one monomer selected from a sixth group (6GP) consisting of (meth) acrylonitrile and methylmethacrylate. The amount of copolymerized monomer of said fifth group (5GP) is about 60 to 75 percent relative to the weight of said subsequent grafted phase (P2) and the amount of copolymerized monomer of said sixth group (6GP) is about 25 to 40 percent relative to the weight of said subsequent grafted phase (P2). The first grafted phase (P1) and the subsequent grafted phase (P2) are chemically different one from the other.

The weight ratio of the first grafted phase to the subsequent grafted phase, (P1)/(P2), is 1/4 to 4/1, preferably the ratio is 1/2 to 2/1.

The grafted rubber is present in particulate form having a weight average particle size of about 0.1 to 1.0, preferably 0.25 to 0.65 microns.

The copolymeric matrix contains at least one copolymerized monomer selected from the group (MX1) consisting of styrene, $\alpha$-methyl styrene, ring-halogenated styrene and ring-alkylated styrene and at least one copolymerized monomer selected from the group (MX2) consisting of (meth) acrylonitrile and methyl methacrylate. The weight ratio (MX1)/(MX2) is in the range of 80/20 to about 65/35.

The composition according to the invention may contain conventional additives, in customary and effective amounts, which are known for their utility in thermoplastic elastomeric molding compositions.

The grafted rubbers of the inventive composition, may be prepared by graft copolymerization of at least one of styrene, $\alpha$-methyl styrene, ring halogenated styrene, ring-alkylated styrene, such as p-methylstyrene and tert.butylstyrene with at least one of (meth)acrylonitrile and methylmethacrylate, in the presence of the elastomeric substrate, which preferably is in the form of a core-shell structure. Since 100% grafting yield cannot be achieved in the graft copolymerization, the polymerization product from the graft copolymerization always contains a proportion of free, non-grafted copolymer (for convenience, the grafted phase is referred to hereinafter in this text as "SAN"). However, for the purposes of the present invention, the term "grafted rubber" is only applied to the rubber to which copolymer have actually been grafted. The proportion of the grafted copolymer in the polymerization product from the graft copolymerization can be determined in the conventional manner by extracting the free, non-grafted copolymer from the polymerization product, for example by methyl ethyl ketone. The principles of the method of separation have been described by Moore, Moyer and Frazer, Appl. Polymer Symposia No. 7, page 67, et seq. (1968).

The degree of grafting, in the present context, refers to the percentage proportion, based on the total graft rubber, of the grafted SAN which is chemically bonded in the grafting branches of the graft SAN copolymer. The degree of grafting may be calculated as is well known to the art-skilled.

The particle size according to the invention is the weight-average particle size as determined by an ultracentrifuge, such as in accordance with the method of W. Scholtan and H. Lange, Kolloid-Z. und Z.-Polymere 250 (1972), 782–796. The ultracentrifuge measurement gives the integral mass distribution of the particle diameters of a sample. From this it is possible to determine that the percentage by weight of the particles have a diameter equal to or less than a certain size.

The crosslinked graft rubber useful as a substrate in the context of the invention may be prepared in the conventional manner by methods which are well known in the art. The crosslinked rubber is a member selected from the group consisting of poly-$C_{2-8}$-alkyl acrylate, hydrogenated polydiene and polydiene. Preferably, the substrate contains an acrylic acid ester polymer having a glass transition temperature of below 0° C., preferably below −20° C., more particularly below −30° C. as determined by DSC method (K. H. Illers, Makromol. Chemie 127 (1969), page 1). Suitable alkyl acrylates are those where the alkyl has 2 to 8 carbon atoms, most preferably the alkyl has 4 to 8 carbon atoms. Specific examples are n-butyl acrylate and 2-ethylhexyl acrylate. The acrylic acid esters may be employed as individual compounds or as mixtures with one another. Crosslinking of the rubber substrate is attained by known means as referred to below in connection with the crosslinking of the shell.

In the preferred embodiment where the substrate contains a core-shell structure, the preferably crosslinked core phase may be prepared by conventional emulsion techniques which are well known in the art. The monomers to be employed are at least one member selected from the group consisting of styrene, α-methyl styrene, ring-halogenated styrene and ring-alkylated styrene, such as p-methylstyrene and tert.butylstyrene. Crosslinking may be attained by the incorporation of small amounts, usually about 0.5 to 10%, preferably 0.5 to 3%, relative to the weight of the core, of any of the polyfunctional monomeric cross-linking agents, which are well known in the art. Examples include triallyl cyanurate, diallyl maleate and divinyl benzene.

The shell is crosslinked rubber selected from the group consisting of poly-$C_{2-8}$-alkyl acrylate, polyhydrogenated diene and polydiene. Preferably, the shell contains an acrylic acid ester polymer having a glass transition temperature of below 0° C., preferably, below −20° C., more particularly below −30° C. The glass transition temperature of the polymer making up the shell may be determined by the DSC method. Suitable alkyl acrylates for the preparation of acrylic acid ester polymers are those where the alkyl has 2 to 8 carbon atoms, most preferably the alkyl has 4 to 8 carbon atoms. Specific examples are n-butyl acrylate and 2-ethylhexyl acrylate. The acrylic acid esters may be employed as individual compounds or as mixtures with one another. In the preparation of the core-shell phases, the monomers making up the shell are polymerized in the presence of the previously prepared core polymer.

In order to obtain crosslinking of the preferred acrylic polymers, the polymerization is preferably carried out in the presence of from 0.5 to 10% by weight, preferably from 0.5 to 3% by weight, based on the total monomers employed for the preparation of the grafting bases, of a copolymerizable, polyfunctional, preferably, trifunctional, monomer which effects crosslinking and subsequent grafting. Suitable bifunctional or polyfunctional crosslinking monomers are those which contain two or more, preferably three, ethylenic double bonds which are capable of copolymerization and are not conjugated in the 1,3-positions. Examples of suitable crosslinking monomers are divinylbenzene, diallyl maleate, diallyl fumarate and diallyl phthalate, triallyl cyanurate and triallyl isocyanurate.

The preparation of the grafted rubber to be employed, according to the invention, may be carried out in accordance with the following method. The preparation of a substrate which is a crosslinked elastomer is well documented in the art. In the embodiment entailing a core-shell structure, the vinyl aromatic core is first prepared by polymerizing the vinyl aromatic monomer(s) to form a core (preferably crosslinked) in aqueous emulsion by conventional methods at from 20 to 100° C., preferably from 50 to 90° C. The conventional emulsifiers, for example, alkali metal salts of alkyl sulfonic acids or alkyl aryl sulfonic acids, alkyl sulfates, fatty alcohol sulfonates, salts of higher fatty acids of 10 to 30 carbon atoms, or rosin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the core polymer. In general, a water:monomer ratio of from 50:1 to 0.7:1 is used. The polymerization initiators used are in particular the conventional persulfates, e.g., potassium persulfate, but redox systems can also be employed. In general, the initiator is used in an amount of from 0.1 to 1% by weight, based on the monomer(s) employed in the preparation of the core. Further polymerization additives which may be employed are the conventional buffers, to bring the pH to about 6 to 9, for example sodium bicarbonate and sodium pyrophosphate, and from 0 to 3% by weight of a molecular weight regulator, for example a mercaptan, terpinol, or dimeric α-methyl styrene.

The precise polymerization conditions, such as the nature, rate of addition, and amount of the emulsifier initiator, and other additives, are selected, within the ranges referred to above so that the resulting latex of the optionally crosslinked vinyl aromatic core polymer attains the desired particle size.

The crosslinked shell, preferably acrylate, shell may be prepared by polymerizing the rubber, preferably one or more alkyl(meth)acrylates in the presence of the previously prepared polyvinyl aromatic core using emulsion polymerization methods well known in the art. The polymerization temperatures are substantially identical to those employed in the preparation of the core and the same conventional initiators, buffers, crosslinking agents, and surfactants may be employed. The weight ratio of the crosslinked shell to the core is preferably from 75/25 to 99/1.

To prepare the grafted rubber, a monomer system containing at least one monomer selected from a group (3GP) consisting of styrene, α-methyl styrene, ring-alkylated styrene, such as p-methylstyrene and tert.butylstyrene with at least one monomer selected from a group (4GP) consisting of (meth)acrylonitrile and methylmethacrylate is polymerized in the presence of the latex of crosslinked rubber. The weight ratio between the monomer of said first group to said monomer of said second group has been stated above.

It is advantageous if this graft copolymerization of the grafted phase onto the crosslinked rubber substrate is carried out in aqueous emulsion under the conventional conditions. The graft copolymerization may be carried out as follows:

The first grafted phase (P1) may be prepared by polymerizing at least one monomer selected from a third group (3GP) consisting of styrene, α-methyl styrene, ring-halogenated styrene and ring-alkylated styrene, and at least one monomer selected from a fourth group (4GP) consisting of (meth)acrylonitrile and methylmethacrylate in the presence of the previously prepared core-shell structure having the indicated particle size. The polymerization may be carried out by well known, conventional emulsion polymerization at 20 to 100° C., preferably 50 to 80° C. Conventional initiators (for instance, water-soluble per-oxy compounds, such as potassium persulfate and azo compounds, such as, azo bis isobutyronitrile) or redox systems employing oil or water soluble oxidizers (for instance, cumene hydroperoxide) coupled with reducing agents (for example, dextrose or sodium bisulfite), and optionally activators (for example, ferric sulfate); surfactants (for example, alkyl sulfates, sulfonates and fatty acid soaps, such as, sodium lauryl sulfate or sodium oleate); buffers (for example, sodium bicarbonate) and polymer molecular weight regulators (for example, n-dodecyl mercaptan), all of which are well known in the art, may be used in conventional amounts in the course of the emulsion polymerization to attain the desired characteristics. The monomers of the third group (3GP) and fourth group (4GP) may be introduced as a single rapid charge, preferably these are introduced in several aliquots over a period of time and most preferably these are introduced as a metered stream. The weight ratio between these monomers (3GP)/(4GP) is in the range of 95/5 to 75/25, more preferably 90/10 to 80/20. The weight ratio of the first grafted phase (P1) to the rubber substrate (S), that is (P1)/(S), is in the range of 0.15/1 to 0.5/1, preferably 0.30/1 to 0.45/1.

The subsequent grafted phase (P2) may be prepared by polymerizing at least one monomer selected from a group (5GP) consisting of styrene, α-methyl styrene, ring-halogenated styrene and ring-alkylated styrene, and at least one monomer selected from a group (6GP) consisting of (meth)acrylonitrile and methylmethacrylate in the presence of the previously prepared grafted substrate (S to which P1 has been grafted) preferably the substrate (S) contains a core (C) and shell (SH) structure and is grafted with the first grafted phase (P1). The polymerization may be carried out by well known, conventional emulsion polymerization under conditions and in the presence of the auxiliaries mentioned above in connection with the polymerization of the first grafted phase (P1). The monomers of the fifth group (5GP) and sixth group (6GP) may be introduced as a single rapid charge, preferably these are introduced in several aliquots over a period of time and most preferably these are introduced as a metered stream. The weight ratio between these monomers (5GP)/(6GP) is in the range of 75/25 to 60/40, more preferably 75/25 to 70/30. The weight ratio of the first grafted phase (P2) to the rubber substrate (S), that is (P2)/(S) is in the range of 0.15/1 to 0.5/1, preferably 0.30/1 to 0.45/1. The first grafted phase (P1) and the subsequent grafted phase (P2) are chemically different one from the other.

As discussed above, the composition in accordance with the invention contains a styrenic copolymeric matrix which includes a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate. The weight ratio between said monomer(s) of said first group to said monomer(s) of said second group has been stated above. The free, non-grafted copolymer formed during the graft copolymerization for the preparation of the grafted rubber component may also form part of the matrix. Preferably, the hard copolymeric matrix has a weight average molecular weight of about 50 to 250, preferably 80 to 150 Kg/mole.

The mixing of the components for the preparation of the inventive composition may be carried out conventionally by method and using equipment which are well known in the art.

The composition may contain, as further components, any additive conventionally used, such as fillers, other compatible plastics, antistatic agents, antioxidants, flame-proofing agents and lubricants. The additives may be used in conventional effective amounts, preferably of from 0.1 to a total of about 30% relative to the total weight of grafted rubber and matrix.

The examples which follow illustrate the invention. In the examples, parts and percentages are by weight, unless stated otherwise.

EXAMPLES

Compositions representative of the invention have been prepared and their properties determined. The results of the determinations are shown in the table below. All the compositions, both the ones representing the invention and the comparative examples, contained 36.5 percent by weight of a grafted rubber and 63.5 percent of a copolymeric matrix. The total rubber content in all the compositions was kept constant, at 25% relative to the weight of the composition. The data enable a comparison between the inventive composition and a corresponding composition wherein the first grafted phase contains no acrylonitrile, that is the first grafting phase contained styrene only (Comparative Example C-1). The data also enable a comparison with a corresponding composition (Comparative Example C-2) where the first grafted phase contains 30%, relative to its weight of acrylonitrile, an amount which places the composition outside the scope of the present invention.

The notched impact strength of the compositions was determined by the method of DIN 53,453 on injection-molded standard small bars at 23° C. These bars were injection molded at 250° C. or 280° C.

The individual components used in the examples were as follows:

Grafted rubber: a rubber having a weight average particle size of 0.4 microns comprising an styrene/acrylonitrile copolymer grafted on to a core-shell structured substrate. The core contained styrene and the shell was crosslinked polybutyl acrylate.

The relative amounts of styrene and acrylonitrile (S/AN ratio) in the first grafted phase are the variable differentiating between Examples 1, 2 and 3 (representing the invention) and comparative examples C-1 and C-2. The number average and weight average molecular weights of the S/AN were, respectively, 45 Kg/mole and 108 Kg/mole. The amount of styrene as core in the core-shell structure used in the examples was 5 percent, and the content of the butyl acrylate shell was 95 percent relative to the weight of the core-shell structure. The first grafted phase (P1) was polymerized from styrene and acrylonitrile at various ratios (the amount of styrene is tabulated), in the presence of the core-shell rubber substrate.

The weight ratio of total monomer (styrene and acrylonitrile) to the core-shell rubber was, for all examples, 0.325/1.

The subsequent grafted phase (P2) was polymerized from styrene and acrylonitrile, weight ratio S/AN=70/30 in the presence of the previously grafted substrate. The weight ratio of total monomer (styrene and acrylonitrile) to the grafted core-shell rubber was, for all examples, 0.325/1. The resulting degree of grafting of the grafted rubber was 31.5% based on the grafted rubber.

Copolymeric matrix: a copolymeric matrix of S/AN where the content of AN is 32% relative to the weight of the copolymer and where the number average and weight average molecular weights of the S/AN were, respectively, 54 Kg/mole and 118 Kg/mole.

| Example | 1 | 2 | 3 | C-1 | C-2 |
|---|---|---|---|---|---|
| amount of styrene in | | | | | |
| the first grafted phase (wt %) | 80 | 85 | 90 | 100 | 70 |
| MMP$^{(i)}$, psi | 667 | 653 | 638 | 638 | 682 |
| opacity$^{(ii)}$ | 97.7 | 97.4 | 97.5 | 97.3 | 97.9 |
| Impact properties Izod, ⅛", J/m | | | | | |
| at 23° C., | 333 | 501 | 381 | 301 | 284 |
| at −30° C., | 45 | 43 | 47 | 30 | 36 |
| Impact properties Izod, ½", J/m | | | | | |
| at 23° C., | 181 | 297 | 176 | 113 | 176 |
| at −30° C., | 69 | 74 | 68 | 40 | 48 |
| multiaxial impact$^{(iii)}$, J | | | | | |
| $E_f$ @ 23° C. | 36 | 38 | 37 | 36 | 37 |
| $E_f$ @ −30° C. | 10 | 17 | 13 | 8 | 8 |
| Yellowness Index | 29.7 | 29.1 | 28.8 | 28.6 | 31.0 |
| reflection Haze | 51.6 | 50.0 | 45.6 | 33.4 | 61.3 |
| Gloss (20 °) | 84.3 | 85.2 | 85.1 | 89.6 | 79.5 |
| gloss (60 °) | 96.1 | 96.3 | 96.7 | 97.6 | 93.3 |

$^{(i)}$MMP = minimum molding pressure at 490° C.
$^{(ii)}$Determined as contrast ratio as explained below
$^{(iii)}$determined in accordance with ASTM D 3763; $E_f$ denotes energy to failure.

The minimum molding pressure at the melt temperature of about 255° C. is indicative of the flow of the composition. The data points to the critical dependence of impact strength and opacity on the compositional makeup of the grafted phase. The contrast ratio (CR) is a measure of opacity and is determined on a molded specimen measuring 3×4×0.1 inch. The determination entails measuring the reflectance first against a black background and again against a white background using a spectrophotometer (Applied Color System; using Illuminant D65 at a 10 degree observer angle). The Y-tristimulus values are calculated based on the three instrument-measured CIE (International Commission on Illumination) L*, a* and b* values. The contrast ratio (CR) is determined as $$CR = 100 \times Y_{(against\ black)} / Y_{(against\ white)}$$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a grafted rubber and a copolymeric matrix wherein grafted rubber includes a substrate, a first grafted phase and a subsequent grafted phase which are sequentially grafted to said substrate, wherein substrate contains a crosslinked elastomer selected from the group consisting of polyalkyl acrylate and hydrogenated polydiene, and said first grafted phase contains a copolymer consisting of at least one vinylaromatic monomer and at least one member selected from the group consisting of (meth)acrylonitrile and alkyl (meth)acrylate, said vinylaromatic monomer and said member relating by weight as 90/10 to 80/20 and where said subsequent grafted phase contains a copolymer of about 70 to 75 percent relative to the weight of said subsequent grafted phase of at least one vinylaromatic monomer, and about 25 to 30 percent relative to the weight of said subsequent grafted phase of at least one member selected from a second group consisting of (meth)acrylonitrile and alkyl(meth)-acrylate, and wherein weight ratio of said first grafted phase to said subsequent grafted phase is 1/4 to 4/1, said grafted rubber is present in particulate form having a weight average particle size of about 0.1 to 1.0 microns, and wherein matrix contains the polymerized product of at least one vinylaromatic monomer and at least one monomer selected from the group consisting of (meth)acrylonitrile and alkyl(meth)acrylate, said first grafted phase and said subsequent grafted phase being chemically different one from the other.

2. The thermoplastic molding composition of claim 1 wherein the substrate contains a core containing the polymerization product of at least one vinylaromatic monomer, and a shell containing a crosslinked elastomer selected from the group consisting of polyalkyl acrylate, hydrogenated polydiene and polydiene.

3. The thermoplastic molding composition of claim 1 wherein said grafted rubber is present in an amount of 15 to 50 percent and said copolymeric matrix is present in an amount of 50 to 85 percent, said percent, both occurrences, being relative to the weight of said composition.

4. The thermoplastic molding composition of claim 1 wherein crosslinked elastomer is polyalkyl acrylate.

5. A thermoplastic molding composition comprising (1) 15 to 50 percent of a grafted rubber (GR), and (2) 85 to 50 percent of a copolymer matrix (MX), the percents for both occurrences being relative to the total weight of (GR) and (MX), wherein grafted rubber (GR) includes a substrate (S) containing a crosslinked elastomer selected from the group consisting of polyalkyl acrylate and hydrogenated polydiene, a first grafted phase (P1) and a subsequent grafted phase (P2) where first grafted phase and subsequent grafted phase are sequentially grafted to said substrate and where weight ratio (S)/(P1+P2) is in the range of 60/40 to 90/10, and wherein said first grafted phase (P1) contains a copolymer consisting of at least one monomer selected from a group (3GP) consisting of styrene, α-methyl styrene, ring-halogenated styrene and ring-alkylated styrene, and at least one monomer selected from a group (4GP) consisting of (meth)acrylonitrile and methylmethacrylate, where polymerized monomer of said (3GP) is present in an amount of 80 to 90 percent relative to the weight of said (P1) and the polymerized monomer of said (4GP) is present in an amount of 10 to 20 percent relative to the weight of said (P1), and where said (P2) contains a copolymer of at least one monomer selected from a group (5GP) consisting of styrene, α-methyl styrene, ring-halogenated styrene and ring-alkylated styrene, and at least one monomer selected from a group (6GP) consisting of (meth)acrylonitrile and methylmethacrylate, where polymerized monomer of said (5GP) is present in an amount of about 70 to 75 percent relative to the weight of said subsequent grafted phase (P2) and the polymerized monomer of said (6GP) is present in an amount of about 25 to 30 percent relative to the weight of (P2), and wherein weight ratio (P1)/(P2) is 1/4 to 4/1, said first grafted phase (P1) and said subsequent grafted phase (P2) being chemically different one from the other, said grafted rubber present in particulate form having a weight average particle size of about 0.1 to 1.0 microns, said copolymeric matrix contains at least one polymerized monomer selected from the group (MX1) consisting of styrene, α-methyl styrene, ring-halogenated styrene and ring-alkylated styrene and at least one polymerized monomer selected from the group (MX2) consisting of (meth)acrylonitrile and methylmethacrylate, where weight ratio (MX1)/(MX2) is in the range of 80/20 to about 65/35.

6. The thermoplastic molding composition of claim 5 wherein weight ratio (S)/(P1+P2) is in the range of 70 to 80 to 30 to 20.

7. The thermoplastic molding composition of claim 5 wherein weight ratio (P1)/(P2) is 33/67 to 67/33.

8. The thermoplastic molding composition of claim 5 wherein weight ratio (P1)/(P2) is 1/2 to 2/1.

9. The thermoplastic molding composition of claim 5 wherein weight average particle size is about 0.25 to 0.65 microns.

10. The composition of claim 3 wherein substrate (S) contains a core (C) and a shell (SH) enveloping said core, where the weight ratio (C)/(SH) is in the range of 1/99 to 25/75 and, where said (C) is polymerized from at least one member selected from the group consisting of styrene, α-methyl styrene, ring-halogenated styrene and ring-alkylated styrene and where shell (SH) comprises a crosslinked elastomer selected from the group consisting of polyalkyl acrylate, and hydrogenated polydiene.

11. The composition of claim 10 wherein said core (C) is crosslinked.

12. The thermoplastic molding composition of claim 5 wherein crosslinked elastomer is polyalkyl acrylate.

* * * * *